Patented Nov. 5, 1946

2,410,425

UNITED STATES PATENT OFFICE 2,410,425

ORGANIC POLYBASIC ACID POLYESTERS OF HYDROXYDIHYDRONORPOLYCYCLO-PENTADIENES

Herman A. Bruson, Philadelphia, Pa., assignor to The Resinous Products & Chemical Company, Philadelphia, Pa., a corporation of Delaware No Drawing. Application March 13, 1944, Serial No. 526,313

6 Claims. (Cl. 260—475)

This invention relates to polyesters of organic polycarboxylic acids and hydroxydihydronorpolycyclopentadienes. More specifically, this invention deals with polyesters of said acids and hydroxydihydronordicyclopentadiene.

These new esters possess the unique property of absorbing oxygen from the air to form products which are insoluble in water and organic solvents. They are particularly useful as coating materials, serving in this respect as drying oils which have been modified with resins.

These esters may be prepared in several different ways. One method is to react at least two mols of dicyclopentadiene with one mol of an organic polycarboxylic acid, advantageously in the presence of an acidic condensing agent such as boron trifluoride, as described in copending application Serial No. 476,639, filed February 20, 1943, of which the present application is a continuation-in-part, whereby addition of each carboxyl group to the endomethylene cycle of the dicyclopentadiene is accompanied by a simultaneous molecular rearrangement of the latter to the nordicyclopentadienyl ring system, thus:

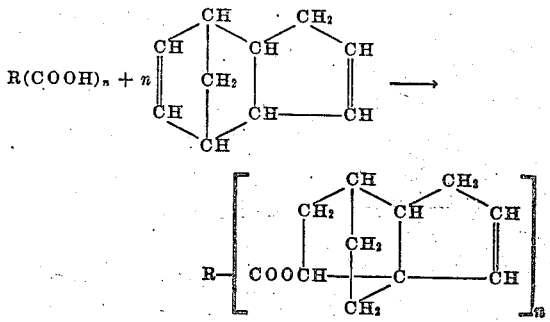

or

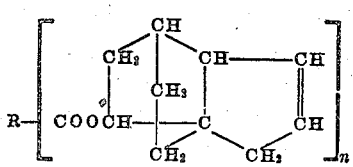

wherein R is the organic residue of a polycarboxylic acid and $n$ is an integer of at least two. The first formula given for the products is more probable, differing from the second only in the position of the double bond of the terminal cyclopenteno group relative to the position of the functional substituent in the opposite terminal cycle, an endoethylene cyclopentano group.

The products as thus obtained may be regarded from one point of view as addition-rearrangement products of a polycarboxylic acid and dicyclopentadiene. They are esters of hydroxydihydronordicyclopentadiene and a polycarboxylic acid and have the general formula:

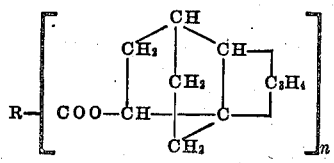

wherein, as before, R is the organic residue of a polycarboxylic acid, $n$ is a small integer of two or more, and $C_3H_4$ is a propylene group which in conjunction with the adjoining carbon atoms forms a cyclopenteno group. The functional carboxyl group is attached to the dihydronordicyclodienyl ring system at a secondary carbon atom flanked by a methylene group and by a tertiary carbon atom in an endoethylene cyclopentano group which carries the said propenylene group forming a cyclopenteno ring therewith.

The addition of a polycarboxylic acid to dicyclopentadiene having two double bonds and one endomethylene cycle per molecule occurs readily at temperatures from about 50° C. to about 145° C., although temperatures both somewhat higher and lower may be used. It is sometimes desirable, but not essential, to use an organic solvent, such as benzene, toluene, xylene, ethylene dichloride, or other organic solvent, in which case the reaction may be effected under reflux.

Small amounts of acidic condensing agents promote the formation of the desired polyesters. The most effective are boron trifluoride and its coordination complexes, such as those formed with boron trifluoride and oxygenated compounds, including aldehydes, ketones, ethers, esters, alcohols, and carboxylic acids, typified by $BF_3.2CH_3CHO$, $BF_3.C_2H_5OC_2H_5$, $BF_3.CH_3COOC_2H_5$, $BF_3.CH_3COCH_3$, $BF_3.C_4H_9OH$, etc. The catalyst may be removed from the reaction mixture by washing with water or mildly alkaline solutions, such as aqueous sodium carbonate solutions.

The reaction product may be dried with conventional drying agents, or water may be removed therefrom by distillation of a solvent. The product may be further purified by treatment with activated clays or charcoal and/or distillation under reduced pressure in many cases.

The compounds formed are esters from one molecule of an organic polycarboxylic acid and at least two molecules of hydroxydihydronordicyclopentadiene.

Another method is to esterify one molecule of the organic polycarboxylic acid or its anhydride with at least two molecules of hydroxydihydronordicyclopentadiene, a new alcohol obtained by the hydration-rearrangement reaction of dicyclopentadiene with water in the presence of sulfuric acid, as described in copending application Serial No. 476,645, filed February 20, 1943, the formation of which may be represented as follows:

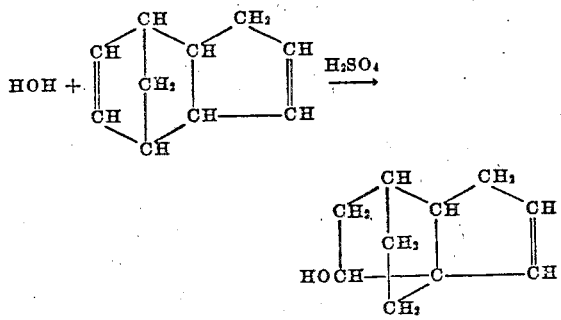

or

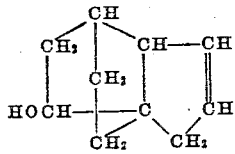

Hydroxydihydronordicyclopentadiene may thus be represented by the formula:

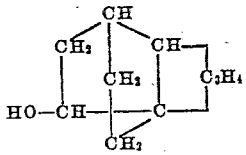

wherein $C_3H_4$ is a propenylene group which in conjunction with the adjoining carbon atoms forms a cyclopenteno group as one terminal cycle.

Still another method for the preparation of the esters of this invention is based upon transesterification or ester interchange. According to this method, an ester of a polycarboxylic acid and an alcohol of lower molecular weight than hydroxydihydronordicyclopentadiene is heated with hydroxydihydronordicyclopentadiene in the presence of a catalyst, such as sodium ethylate or sulfuric acid, and the alcohol of lower molecular weight displaced. Thus, by displacing at least two molecules of a lower molecular weight alcohol with hydroxydihydronordicyclopentadiene, there may be prepared polyesters of said acid and said compound which contain only these components or which contain these components in addition to another alcoholic residue or other alcoholic residues.

Particularly useful polyesters are derived from carbonic, oxalic, malonic, succinic, maleic, fumaric, chloromaleic, glutaric, α,α-diethyl glutaric, itaconic, adipic, pimelic, suberic, azelaic, sebacic, phthalic, 3,6 - endomethylene-1,2,3,6-tetrahydrophthalic, Δ³-tetrahydrophthalic, tartaric, malic, citric, and tricarballylic acids. Esters may also be prepared from other polycarboxylic acids, such as γ-alkyl-γ-carboxypimelic acids, delta-ketonic tetracarboxylic acids (cf. United States Patent 2,329,432), and the carbocyclic compounds in which two to six β-carboxyethyl groups are joined to unsaturated carbocycles (cf. United States Patent No. 2,339,218).

The new esters are advantageously used as vehicles in preparing paints, varnishes, and similar coating materials. For this purpose, they may be admixed with at least one oxidation catalyst. The oxidation catalysts include peroxides, such as benzoyl peroxide, tert. butyl hydroperoxide, or lauroyl peroxide, and metallic driers, such as the oil-soluble salts of heavy metals, typified by lead, cobalt, manganese, and other polyvalent metals supplying siccative action, and of carboxylic acids imparting oil-solubility to the salt, including naphthenic acids, long-chained fatty acids such as linoleic and linolenic, and ether acids, such as butoxyacetic or octyloxyacetic acids. Mixtures of peroxides and metallic driers are particularly efficacious.

When coating compositions comprising the polyesters of this invention and an oxidation catalyst are applied to surfaces which are then exposed to air or preferably baked at 130° C. to 190° C., they are converted to hard, tough films, which are substantially insoluble in all common organic solvents and are highly water-resistant and nonporous. When used in finishes on metal, exceptional adhesion is obtained, and treated metal sheets finished with a baked coating may be flexed without cracking or breaking of the film.

Since the new esters are compatible with nitrocellulose as well as with the natural drying oils, for example, linseed, tung, soyabean, oiticica, and fish oils, as well as with many natural and synthetic resins, they may be used for the preparation of a wide variety of coating and plastic compositions.

The following examples illustrate the preparation and properties of these esters:

*Example 1*

Fifty-nine grams of diethyl carbonate was mixed with 150 grams of hydroxydihydronorcyclopentadiene and one gram of sodium was added. The resulting mixture was heated in a still under such conditions that the temperature of the vapor did not exceed 90° C. About 33 grams of distillate was taken off between 80° and 85° C. The pressure was then reduced and distillation continues until no more ethyl alcohol was obtained. Thereupon, the still residue was distilled under reduced pressure. The fraction boiling between 200° and 240° C. at 3 mm. was a pale yellow viscous oil, amounting to 61 grams, which upon redistillation boiled at 217°–220° C./2.5 mm. Its analysis agreed with the formula for di-(dihydronordicyclopentadienyl) carbonate, $$C_{10}H_{13}-O-CO-O-C_{10}H_{13}$$

It possessed the following constants: $N_D^{25}$ 1.5288; $d_4^{25}$ 1.0216.

The above ester was mixed with such amounts of lead, cobalt, and manganese naphthenates as siccatives that 0.50% of lead, 0.02% of cobalt, and 0.02% of manganese by weight, respectively, were present in the mixture. A film of this composition was formed on a glass plate and allowed to dry in the air at room temperature. After forty-eight hours, a hard, dry, colorless film resembling an oleoresinous varnish was obtained.

*Example 2*

A mixture of 36.5 grams of adipic acid, 90 grams of hydroxydihydronordicyclopentadiene, 120 grams of benzene, and 0.5 gram of sulfuric acid (95%) was stirred and boiled under a reflux condenser attached to a water trap for six hours until no more water distilled over with the benzene. The product was cooled, washed several times with cold water, then with dilute sodium carbonate solution, followed by a water wash. The benzene was evaporated off and the excess hydroxydihydronordicyclopentadiene distilled off in vacuo.

The residual oil consisted essentially of di-(dihydronordicyclopentadienyl) adipate, $C_{10}H_{13}$—OCO—$CH_2CH_2CH_2CH_2$COO—$C_{10}H_{13}$ Upon distillation in high vacuo, it boiled between 250° and 270° C. at 3 mm. and formed a pale yellow oil which crystallized on standing. After recrystallization from ethanol, it formed colorless crystals melting at 75°–77° C.

A solution of the above ester in benzene was mixed with lead, cobalt, and manganese naphthenates to give a composition containing 0.25% of lead, 0.02% of cobalt, and 0.02% of manganese on the weight of the ester. A film of this solution was baked on a steel panel for one hour at 150° C. to yield a hard, varnish-like coating.

*Example 3*

A mixture of 180 grams of hydroxydihydronordicyclopentadiene, 59 grams of succinic acid, 200 grams of benzene, and one gram of sulfuric acid (95%) was boiled under a reflux condenser attached to a water trap for six and one-half hours, at which time 18 grams of water had been collected. The product was then cooled and mixed with ten grams of calcium hydroxide. This mixture was stirred for several hours and filtered. The filtrate was evaporated to dryness. The product, consisting essentially of di-(dihydronordicyclopentadienyl) succinate crystallized on standing. After recrystallization from methanol, it formed colorless crystals melting at 100° C.

*Example 4*

(a) A mixture of 66 grams of dicyclopentadiene, 22.5 grams of anhydrous oxalic acid, and 75 grams of tetrachlorethane was stirred and boiled under reflux at 135°–140° C. for five hours. The product was cooled, washed with water, with dilute soda solution until free from acidity, and again with water. The liquid was dried and then evaporated under reduced pressure to remove the tetrachlorethane. The residual dark, viscous product consisted essentially of crude di-(dihydronordicyclopentadienyl) oxalate. The yield was 75 grams.

(b) A mixture of 126 grams of oxalic acid dihydrate, 380 grams of hydroxydihydronordicyclopentadiene, 200 grams of benzene, and one gram of 98% sulfuric acid was stirred and boiled under a reflux condenser attached to a water trap. At the end of three and one-half hours of boiling, 74 cc. of water had been separated in the trap, indicating that the esterification was complete. The product was cooled to room temperature and stirred for a half hour with ten grams of powdered calcium hydroxide and five grams of water to destroy free acidity. The precipitate which was formed was filtered off and the filtrate heated in vacuo up to a vapor temperature of 200° C./2 mm. to distill therefrom the excess of alcohol. The residue, consisting of a black thick syrup, was mixed with an equal volume of petroleum ether and chilled, whereupon the crude oxalate crystallized out and was filtered off. After recrystallization from petroleum ether, the di-dihydronordicyclopentadienyl oxalate formed colorless crystals having a melting point of 83°–85° C.

*Example 5*

A mixture of 49 grams of maleic anhydride, 70 grams of benzene, 302 grams of hydroxydihydronordicyclopentadiene, and 1.5 grams of concentrated sulfuric acid was boiled under a reflux condenser attached to a water trap for three hours, during which time 8.5 grams of water was collected in the trap. The reaction product was cooled to room temperature and stirred for several hours with five grams of powdered calcium hydroxide. The mixture was filtered and the clear filtrate distilled at 3 mm. until the benzene and excess hydroxydihydronordicyclopentadiene had been stripped off.

The residual product, consisting of di-(dihydronordicyclopentadienyl) maleate, was a thick oil. When heated in the air at 190°–200° C., it rapidly polymerizes to a hard resin. Films of the oil dry by oxidation in the air.

A solution of equal parts of the above ester and linseed oil was mixed with 0.50% of lead, 0.02% of cobalt, and 0.02% of manganese in the form of the corresponding naphthenate driers, and films of this solution baked on steel plate at 150° C. for one to two hours. Hard, adherent, tough, mar-proof coatings were obtained.

*Example 6*

A mixture of 178 grams of sebacic acid, 531 grams of hydroxydihydronordicyclopentadiene, 110 grams of ethylene dichloride, and 1.5 grams of concentrated sulfuric acid was boiled for two hours under a reflux condenser attached to a water trap until 33 cc. of water had been collected. The product was cooled, stirred for two hours with five grams of powdered lime, filtered, and the clear filtrate evaporated to dryness. The residual oil was heated in vacuo to strip off the excess of the alcohol used. The final product was a thick oil consisting essentially of di-(dihydronordicyclopentadieneyl)-sebacate.

A solution was prepared by mixing this ester with driers to give a composition containing 0.5% of lead, 0.03% of cobalt, and 0.03% of manganese in the form of their naphthenates. A film of this solution was formed on a steel plate and baked for two hours at 135°–150° C. A hard, tough, adherent, mar-proof film of excellent quality was thus obtained.

In the same manner as described in Example 6, the phthalic acid ester of dihydronordicyclopentadienyl phthalate is obtained as a thick oil by using 150 grams of phthalic anhydride in place of the sebacic acid. When mixed with driers as described above, it gives a hard film when baked for two hours at 150° C.

The corresponding tartaric acid, tricarballylic acid, citric acid, 3,6-endomethylene-1,2,3,6-tetrahydrophthalic acid polyesters of hydroxydihydronordicyclopentadiene can be similarly prepared. They are thick, autoxidizable, polymerizable oils useful for the preparation of coatings.

The poly-dihydronorpolycyclopentadienyl esters of a polycarboxylic acid may be represented by the general formula:

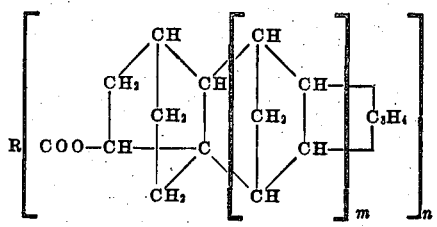

wherein R and $n$ have the same significance as above and $m$ is a number from zero to three, inclusive.

While in the above examples essentially pure dicyclopentadiene or the alcohol derived therefrom by addition of water and rearrangement to the norcyclopentadienyl system is used, there may be used with similar results higher polycyclopentadienes or mixtures of dicyclopentadiene and higher crystalline polycyclopentadienes having two double bonds per molecule. There may be prepared mixtures of crystalline di-, tri-, tetra-, and penta-cyclopentadiene having two double bonds and one to four endomethylene cycles per molecule. These undergo the same esterifying reactions as pure dicyclopentadiene. Further details of the behavior of these polycyclopentadienes are given in the parent application. The polyesters of the various hydroxydihydronorpolycyclopentadienes of the type aforesaid all have the drying properties above described and are useful in coating compositions.

From the foregoing, it can be seen that the dihydronordicyclopentadienyl polyesters of organic polycarboxylic acids are unique and valuable materials. They are particularly useful as varnishes or lacquers, either alone or with siccatives. They may be mixed in compositions with drying or semi-drying oils, alkyd resins, and other film-forming materials. They may be blown and bodied to a viscous state. They may be mixed with other autoxidizable derivatives from polycyclopentadiene, including the esters of hydroxydihydronordicyclopentadiene and unsaturated higher aliphatic acids which are claimed in copending application Serial No. 526,312, filed on even date.

I claim:

1. As a new compound, a polydihydronorpolycyclopentadienyl ester of a polybasic organic carboxylic acid, said ester being the acid-catalyzed addition-rearrangement product of a polybasic carboxylic acid and a crystalline polycyclopentadiene having two double bonds and one to four endomethylene cycles per molecule, said ester being further characterized by having each carboxylic ester group attached to a terminal cycle from the rearranged polycyclopentadiene at a secondary carbon atom thereof, the opposite terminal cycle thereof being a five-membered ring containing one olefinic linkage.

2. As a new compound, a polydihydronordicyclopentadienyl ester of a polybasic organic carboxylic acid, said ester being the acid-catalyzed addition-rearrangement product of a polybasic carboxylic acid and dicyclopentadiene, said ester being further characterized by having the carboxylic ester groups attached to a terminal cycle from the rearranged dicyclopentadiene at a secondary carbon atom thereof, the opposite terminal cycle thereof being a five-membered ring containing one olefinic linkage.

3. As a new compound, a di-(dihydronordicyclopentadienyl) ester of a dicarboxylic organic acid, said ester being the acid-catalyzed addition-rearrangement product of a dicarboxylic acid and dicyclopentadiene, said ester being further characterized by having each carboxylic ester group attached to a terminal cycle from the rearranged dicyclopentadiene at a secondary carbon atom thereof, the opposite terminal cycle thereof being a five-membered ring containing one olefinic linkage.

4. As a new compound, the di-(dihydronordicyclopentadienyl) ester of maleic acid, said ester being the acid-catalyzed addition-rearrangement product of maleic acid and dicyclopentadiene, said ester being characterized by having each carboxylic ester group attached to a terminal cycle from the rearranged dicyclopentadiene at a secondary carbon atom thereof, the opposite terminal cycle thereof being a five-membered ring containing one olefinic linkage.

5. As a new compound, the di-(dihydronordicyclopentadienyl) ester of sebacic acid, said ester being the acid-catalyzed addition-rearrangement product of sebacic acid and dicyclopentadiene, said ester being characterized by having each carboxylic ester group attached to a terminal cycle from the rearranged dicyclopentadiene at a secondary carbon atom thereof, the opposite terminal cycle thereof being a five-membered ring containing one olefinic linkage.

6. As a new compound, the di-(dihydronordicyclopentadienyl) ester of phthalic acid, said ester being the acid-catalyzed addition-rearrangement product of phthalic acid and dicyclopentadiene, said ester being characterized by having each carboxylic ester group attached to a terminal cycle from the rearranged dicyclopentadiene at a secondary carbon atom thereof, the opposite terminal cycle thereof being a five-membered ring containing one olefinic linkage.

HERMAN A. BRUSON.